United States Patent [19]
Meyer

[11] 4,206,411
[45] Jun. 3, 1980

[54] RADIO CONTROLLED MODEL AIRCRAFT CONTROL SYSTEM

[75] Inventor: Heinz Meyer, Nuremberg, Fed. Rep. of Germany

[73] Assignee: Grundig E.M.V., Fuerth, Fed. Rep. of Germany

[21] Appl. No.: 921,457

[22] Filed: Jul. 3, 1978

[30] Foreign Application Priority Data
Jul. 13, 1977 [DE] Fed. Rep. of Germany ....... 2731571

[51] Int. Cl.³ ............................................. H04B 12/00
[52] U.S. Cl. .................................. 340/695; 340/167 A
[58] Field of Search ...................... 325/390, 391, 392; 343/225; 340/167 A

[56] References Cited
U.S. PATENT DOCUMENTS

| | | | |
|---|---|---|---|
| 3,774,217 | 11/1973 | Bonner | 343/225 |
| 4,059,731 | 11/1977 | Green | 179/15 BY |
| 4,072,898 | 2/1978 | Hellman | 325/392 |

*Primary Examiner*—David L. Stewart
*Attorney, Agent, or Firm*—Kane, Dalsimer, Kane, Sullivan and Kurucz

[57] ABSTRACT

A method and apparatus are disclosed for the emergency control of model aircraft. The incoming signals to the model are screened and, if missing or outside acceptable limits, the screened signals are replaced with a sequence of preprogrammed emergency signals which control the model into an emergency procedure.

8 Claims, 3 Drawing Figures

RADIO CONTROLLED MODEL AIRCRAFT CONTROL SYSTEM

BACKGROUND OF THE INVENTION

The present invention relates to model aircraft and in particular to the remote radio control of such aircraft by means of series of PDM signals.

One of the major causes of accidents involving model airplanes is loss of control. Each year deadly accidents occur as a result of persons being struck by such models or slashed by the rotating propeller blades of a model out of control.

Tests conducted in Germany show that in 80% of model airplane accidents the aircraft remote control apparatus was intact after the accident indicating that the malfunction that lead to the accident was caused by interference with control signal transmission. The loss of communication between the model operator on the ground and his aircraft is thus believed to be a major cause of model aircraft accidents.

In view of the above, it is the principal object of the present invention to provide a system for the safe control of model aircraft in the event of a loss of communication between a model operator and his aircraft.

A further object is to provide such a system which automatically shifts the model into a predetermined pattern in the event of a loss of communication which permits the model to be safely brought to the ground.

SUMMARY OF THE INVENTION

The above and other beneficial objects and advantages are attained in accordance with the present invention by providing a safety circuit to screen transmissions to a radio control model vehicle receiver. If the transmitted operating signals for a particular function are missing or outside preset limits, the safety circuit generates emergency signals for the function to guide the model safely.

DETAILED DESCRIPTION OF THE PREFERRED EMBODIMENTS

Figure 1:
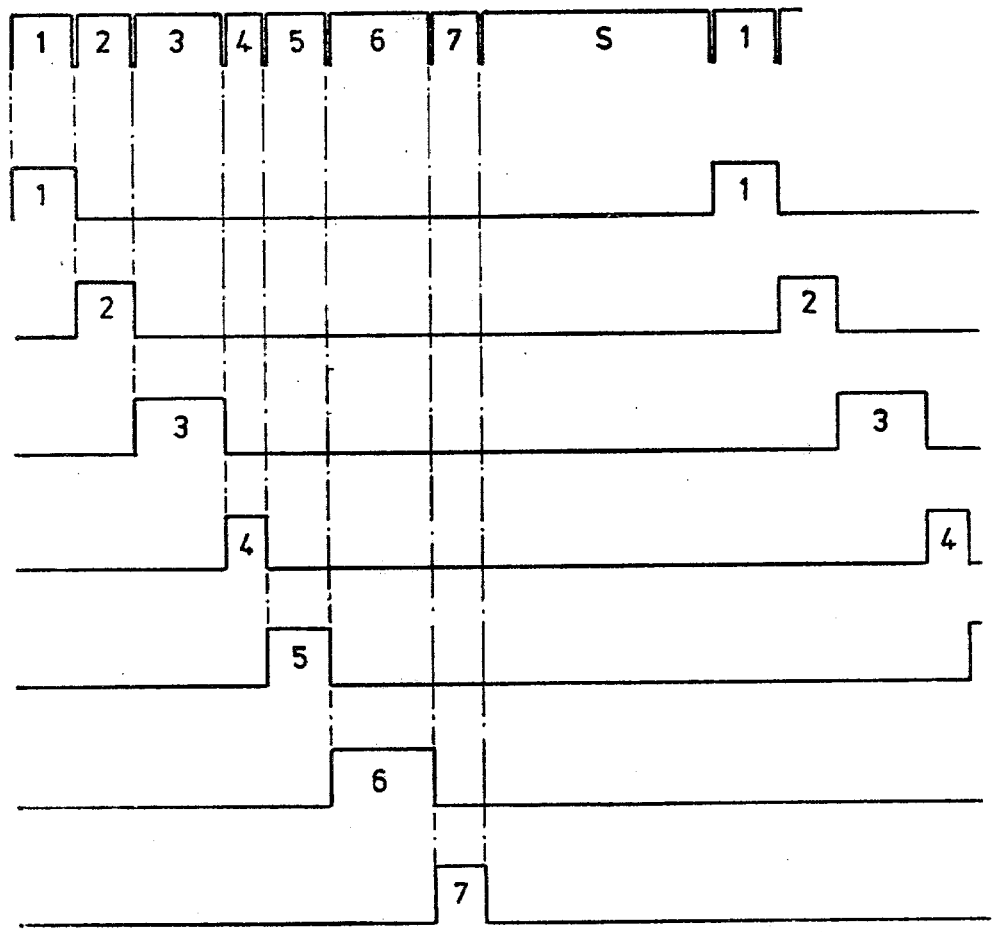
FIG. 1 is a wave form diagram depicting a series of PDM operating signal pulses for a model aircraft along with the extracted operating and synchronizing signals.

Reference is first made to FIG. 1 wherein a typical chain of PDM (pulse duration modulation) signals for the remote radio control of a model vehicle is depicted. The signal chain may, for example, comprise seven individual pulses 1 through 7 and synchronizing signal S. The individual signals 1 through 7 are separated by pulse gaps of equal length. The individual signals 1 through 7 may be extracted from the signal chain in a manner well known to those familiar with the art to thereby produce the individual signals 1 through 7 as shown in the lower portion of FIG. 1. Suffice it to say for the present that each of the individual operating signals 1 through 7 is of a predetermined time duration the period of which is between 0.8 and 2.3 ms, depending from the informations to be transmitted. The duration of the entire signal chain generated by operating signals 1 through 7 and the synchronizing signal S is about 20 ms.

In model aircraft radio remote control different functions of the model aircraft are controlled by different ones of the operating signals. Thus, when for example, interference conditions prevent a transmission of operating signal 5, the corresponding function will not be executed by the model. Hence, the lack of transmission could be the cause of a serious accident if the exercise of the corresponding function was necessary to avoid the accident. In accordance with the present invention, a safety circuit is provided to screen the presence and duration of the individual operating signals 1 through 7 to thereby insure that each of the corresponding functions may be attained.

Figure 2:
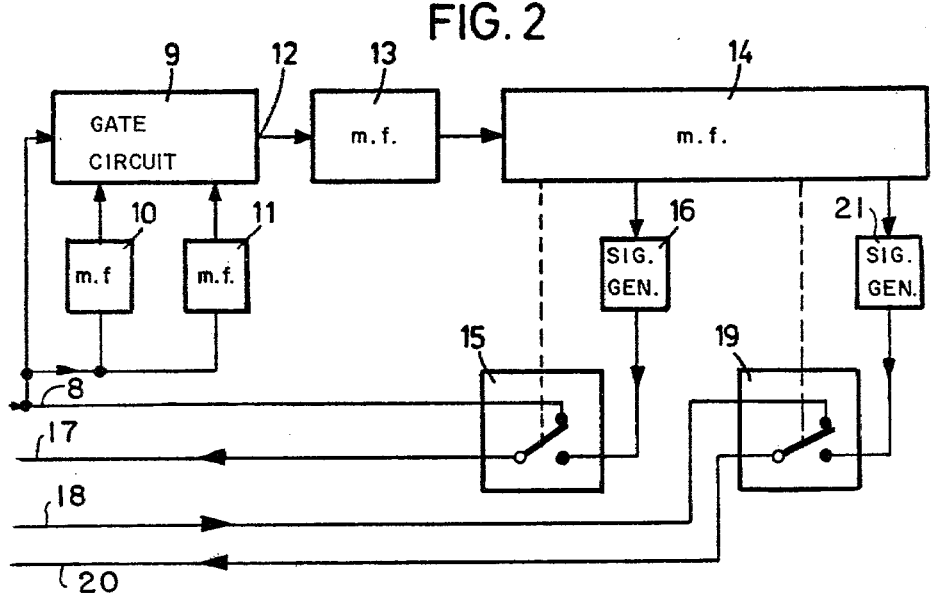
FIG. 2 is a block diagram of the screening circuit which determines the presence and duration of the individual signals in accordance with the present invention; and, FIG. 3 is a block diagram of a screening circuit for determining the presence and duration of a plurality of individual signals of a chain of signals.

Reference is now made to FIG. 2 wherein a safety circuit is depicted in block diagram form. An operating signal (for example the previously extracted operating signal 5) is fed through the input 8 of the safety circuit to a gate circuit 9 as well as to two retriggerable monoflops 10 and 11. The monoflops 10 and 11 are stable in one state for the minimum or maximum duration of an unadultered individual signal before returning to an original state. The monoflops 10 and 11 thus control gate circuit 9. When an operating signal of a predetermined pulse duration is fed to the safety circuit through input 8, an output signal is present at the output 12 of the gate circuit. Not so if the pulse is missing or the duration of the pulse falls outside the limits determined by the holding times of monoflops 10 and 11. The signal which is present at the output 12 of the gate 9 triggers a third retriggerable monoflop 13 which acts as a slow relay. This third monoflop 13 controls a fourth slow relay monoflop 14. After monoflop 14 is triggered, it in turn, triggers an electronic multiposition switch 15 as well as a signal generator 16. The normal position of switch 15 is as shown in FIG. 2. Thus, a signal at the input 8 of the safety circuit would appear at the output 17 of the circuit with the switch 15 in position as shown. However, when the electronic multiple switch 15 is actuaded, the operating signal is not fed to the output 17 of the safety circuit by means of the electronic multiple switch as would be the case in a normal situation. Instead, perdetermined emergency signals generated by the signal generator 16 are available at the output 17 of the safety circuit.

In many cases, once a malfunction is detected, it is necessary to replace a second operating signal with an emergency signal. For example, if the control signals to the model aircraft's stabilizer fails, it would also be necessary to reduce the revolution of the motor. This is done in a simple manner in accordance with the present invention in that the second operating signal for the function (motor revolution) is fed to an additional input 18 of the safety circuit, from where it is fed through a second electronic multiple switch 19 and to a second output 20 of the safety circuit. When the first malfunction is detected, and monoflop 14 triggered, switch 19 as well as an associated signal generator 21 are actuated simultaneously with the actuation of switch 15 and generator 16. This results in replacing not only the adversely affected operating signal during interference but at the same time the operating signal which controls the revolution of the motor by means of an emergency signal. Naturally, additional functions could also be triggered (i.e., braking, actuating a parachute, etc.) by adding additional switch circuits and emergency signal generators.

Many variations of the aforementioned inventive idea are possible. For example, it is possible to screen the entire chain of signals and to replace the total chain of signals with predetermined emergency signals if even one individual operating signal malfunctions. A suitable circuit for this embodiment is shown in block diagram in FIG. 3. The individual operating signals which are present at the input 22 of the safety circuit are normally fed through an electronic multiple switch 23 to the output 24 of the safety circuit. Simultaneously, with being fed to switch 23, the operating signals are fed from the input 22 of the safety circuit to a gate circuit 25, a synchronizing element 26 and a timing stage 27. The timing stage 27 is actuated by the synchronizing stage 26 in such a way that the synchronizing pulses S (of FIG. 1) are filtered out since they are no longer of any use. Simultaneously, the synchronizing stage 26 sets a first and second monoflop 10 or 11 at each pulse gap which appears between the operating signals of the signal chain. The first monoflop 10 and the second monoflop 11 set the minimum and maximum holding time. The monoflops control the gate circuit 25 in such a way that at the output 28 of gate 25 an output signal is only generated when the individual operating signals 1 through 7 are present and their pulse duration is within the predetermined limits. If need be, the synchronizing pulse in conjunction with at least one individual operating signal pulse may be used as a criteria. The signal at output 28 of gate circuit 25 controls a slow relay circuit retriggerable monoflop 29 whose holding time exceeds the period of duration of the signal chain by a short time. An output signal is only present at the output 30 of the third monoflop 29 when the signal chain has receiving gaps of less than a period. The signal at output 30 of the third monoflop 29 controls an up-down-integrator 31, the output signal of which drops below a defined value when its input signal remains absent for a longer time period. If the value of the output signal of integrator 31 lower than a value stored in comparator 32, the comparator 32 actuates the electronic switch 23 and a signal generator 33, whereby the signals present at the input 22 of the safety circuit are not fed to the output 24 of the safety circuit, but instead emergency signals from the signal generator 33 are fed to the output 24 of the safety circuit. Naturally, in this embodiment, the signal generator 33 must replace all of the operating signal with a corresponding number of emergency signals.

When using a microprocessor, the individual operating signals used in certain situations may be stored as emergency signals and may be used at any given time as such.

Figure 3:
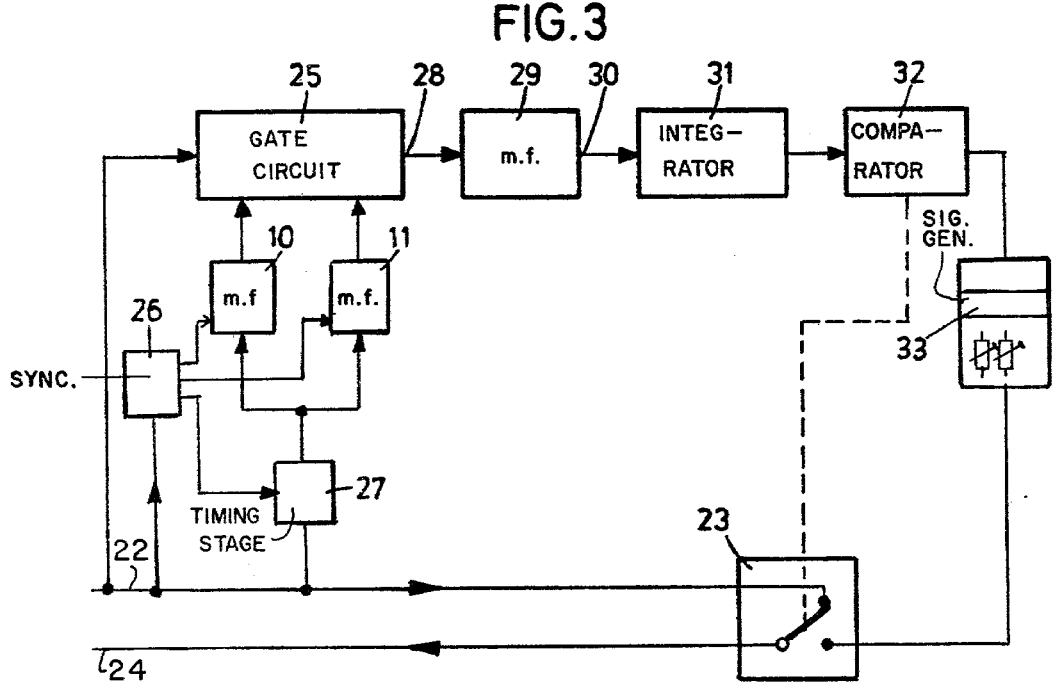

With the circuit of FIG. 2 as well as FIG. 3, it is possible to trigger additional functions in case of a malfunction, for example, braking a land or sea vehicle, throttling of the drive or actuation of a parachute.

It had been shown to use the delay relays in the described embodiments only when signals malfunction.

Naturally, a corresponding delay relay may be provided which delays a reverse circuit of the safety circuit back to normal condition after normal conditions are obtained again.

Should it be desired to maintain a defined number of revolutions for the motor or for the propeller in case of interference, it is possible to attach an optical sensor at a sutiable place which detects the rotating frequency of the motor or the propeller and feeds this information to a speedometer which then adjusts the number of revolutions in know manner.

Having thus described the invention, what is claimed is:

1. A circuit for the emergency radio control of model vehicles in the event individual PDM signals of a controlling PDM chain of signals are missing or outside defined tolerances comprising:
   an input to said circuit;
   an output from said circuit;
   switch means having a first position connecting said input with said said output and a second position connecting an emergency signal generator with said output;
   an emergency signal generator;
   gate means connected to said circuit inputs and said switch means; and,
   screening means connected to said circuit input for and said gate means for actuating said gate to switch said switch means from said first to said second position in the event said individual PDM signals are missing or outside defined upper and lower tolerance levels;
   Said screening means comprising first and second monoflops, one of said monoflops having a time duration of said upper level and the other of said monoflops having a time duration of said lower level.

2. A circuit according to claim 2 wherein a delay element is interposed between said gate and said switch means.

3. a circuit according to claim 2 wherein the delay element is only active when deviations from normal conditions occur, but not when normal conditions are reestablished.

4. A circuit according to claims 1, 2 or 3 comprising a second signal generator, means for activating said second signal generator when said signal generator is activated, and means for blanking out an additional PDM signal and replacing said additional signal with the output of said second signal generator.

5. A circuit in accordance with claims 2, 4 or 5 wherein said signal generator is provided for generating a complete signal chain.

6. A circuit according to claims 1, 2 or 3 comprising: a retriggerable third monoflop connected to the output of said gate and a fourth monoflop coupled to the output of the third monoflop, said fourth monoflop being connected in controlling relationship to said switch and said signal generator.

7. A circuit in accordance with claims 1, 2 or 3 comprising a third monoflop the holding time of which corresponds to the period of duration of the PDM chain of signals, an up-down-intergrator is coupled to the output of the third monoflop, a comparator coupled to the output of the integrator, and said switch and signal generator are coupled to said comparator.

8. A circuit according to either claim 6 or 7 wherein the signal generator comprises a microprocessor.

* * * * *

UNITED STATES PATENT AND TRADEMARK OFFICE
CERTIFICATE OF CORRECTION

PATENT NO. : 4,206,411
DATED : June 3, 1980
INVENTOR(S) : Heinz Meyer

It is certified that error appears in the above—identified patent and that said Letters Patent are hereby corrected as shown below:

At Col. 4, Claim 2, line 1 - "2" should read -- 1 --.

At Col. 4, Claim 5, line 1 - "2, 4 or 5" should read -- 1, 2 or 3 --.

Signed and Sealed this

Fifth Day of August 1980

[SEAL]

Attest:

SIDNEY A. DIAMOND

Attesting Officer

Commissioner of Patents and Trademarks